United States Patent [19]
Miwa et al.

[11] Patent Number: 5,301,617
[45] Date of Patent: Apr. 12, 1994

[54] PARALLEL TRAVELING CONTROL SYSTEM

[75] Inventors: Katsuhiko Miwa, Kassel, Fed. Rep. of Germany; Alan Arai, Kariya, Japan

[73] Assignee: Aisin Seiki Kabushiki Kaisha, Japan

[21] Appl. No.: 844,872

[22] Filed: Mar. 3, 1992

Related U.S. Application Data

[63] Continuation of Ser. No. 525,683, May 21, 1990, abandoned.

[30] Foreign Application Priority Data

May 19, 1989 [JP] Japan .................................. 1-125745

[51] Int. Cl.$^5$ .................................................. B60T 7/16
[52] U.S. Cl. ........................................ 180/168; 180/6.24
[58] Field of Search ............... 180/197, 167, 168, 169, 180/6.2, 6.24, 275, 6.44, 276, 6.62, 277, 131; 318/580, 587, 581, 568.12; 364/424.02; 188/16, 354; 303/100

[56] References Cited

U.S. PATENT DOCUMENTS

| | | | |
|---|---|---|---|
| 3,288,232 | 11/1966 | Shepherd | 180/6.2 |
| 4,361,202 | 11/1982 | Minovitch | 180/168 |
| 4,702,330 | 10/1987 | Vatter et al. | 180/6.24 |
| 4,754,824 | 7/1988 | Olsson | 180/6.48 |
| 4,786,164 | 11/1988 | Kawata | 180/168 |

FOREIGN PATENT DOCUMENTS 2028032 2/1980 United Kingdom ................. 318/587

OTHER PUBLICATIONS

Hans Hagen's Der Spurgefuhrte Omnibus-Dual Mode Bus article on pp. 189-192 of Automobiltechnische Zeitschrift published in Germany in 1979.

*Primary Examiner*—Richard M. Camby
*Attorney, Agent, or Firm*—Banner, Birch, McKie & Beckett

[57] ABSTRACT

A parallel traveling control system detects distances to a guide rail provided on a road surface of a traveling lane or set close thereto, and drives the brake pressures in such a direction that the distances between the vehicle and the guide rail coincide with set values. Additionally, the system detects the rotation of the steering wheel, designates automatic parallel traveling in which the brake pressures are driven to correct the vehicle's direction, and terminates automatic parallel traveling when the steering wheel is rotated more than a predetermined angle.

6 Claims, 7 Drawing Sheets

PARALLEL TRAVELING CONTROL SYSTEM

This application is a continuation of application Ser. No. 07/525,683, filed May 21, 1990 now abandoned.

BACKGROUND OF THE INVENTION

The present invention is directed generally to automatic control over an advancing direction of a vehicle which travels on a road surface, and more particularly, to an advancing direction automatic control system for parallel traveling while automatically keeping constant distances to guide means provided on the road surface of a traveling lane or aside of the lane or set in the air along the traveling lane.

With the intention of attaining high-density traveling in which vehicle intervals are shortened on a highway, there have hitherto been proposed automatic parallel traveling control and automatic acceleration/deceleration control, the arrangement being such that: a guide board is disposed along a traveling lane; distances between a vehicle and the guide board and a distance to a preceding vehicle are measured from on the vehicle; a steering shaft is automatically rotationally driven so that the distances between the guide board and the vehicle come to set values; if the distance to the preceding vehicle is large, the vehicle is accelerated by opening a throttle valve; whereas if small, the vehicle is made to travel in parallel with the guide board by automatically effecting wheel braking; and at the same time the inter-vehicle distance is shortened to the greatest possible degree so as to be more than the set value. There have also been proposed automatic parallel traveling control and automatic acceleration/deceleration control wherein a white line on the road surface is picked up on a video picture while photographing the front road surface by means of a TV camera, the steering shaft is automatically rotationally driven so that a distance between the white line and the vehicle of user's own becomes a set value, and opening/closing of the throttle valve and wheel braking are controlled by detecting a front vehicle and obstacles.

In these proposals of the automatic parallel traveling control, if the distance between the vehicle and guide means such as the guide board and the white line deviates from the set value, the steering shaft is automatically rotationally driven to move forward in such a direction as to obviate this deviation. As a result, the driver feels it strange that a steering wheel rotates, though not intended to make revolutions. For instance, in the case of a curved traveling lane, the driver visually recognizes the curvedness and therefore turns the steering wheel to adjust the vehicle to the curvature of the traveling lane. A driver accustomed to power assist steering is not so amazed at the auto-rotation of the steering wheel with no feeling of strangeness. If the vehicle starts deviating from a straight traveling lane due to, e.g., a heavy sideway wind, and thus the steering wheel is automatically rotationally driven to compensate the deviation, it follows that the driver will be alarmed about the abrupt auto-rotation of the steering wheel unless the driver himself or herself recognizes the possible of disturbance in the advancing direction which is caused by the sideway wind at that time. As is broadly known, mental disturbances induced during highspeed traveling are unfavorable in terms of safe driving.

When the driver changes the traveling lane, the steering wheel is automatically rotationally driven in such a direction that the automatic parallel traveling control functions to hinder a change in course that deviates from the lane along which the vehicle is now traveling, as a consequence of which the driver is not allowed to smoothly change the traveling lane. Hence, there are required release operations of returning a parallel traveling indication switch for indicating the auto parallel traveling control to an open state where releasing is designated or putting a separately provided release indication switch into a closed state where the drivers gives an instruction of releasing.

On the occasion of a change in course or exiting from the highway, the necessity for the above-mentioned releasing operations probably adds a danger to driving of the vehicle, and it is therefore desirable that the parallel traveling control be automatically released without requiring special operations.

SUMMARY OF THE INVENTION

It is a first object of the present invention to eliminate a strange feeling of driver that is derived from auto-rotation of a steering wheel under automatic parallel traveling control.

It is a second object of the present invention to automatically release the parallel traveling control as the necessity arises without putting special burdens on the driver.

To accomplish the first object, according to a first embodiment of the present invention, there is provided a parallel traveling control system comprising: brake pressure adjusting means for adjusting brake pressures of bilateral wheel brakes; distance detecting means for detecting distances to a guide means provided on a road surface of a traveling lane or set in the vicinity of the road surface along the traveling lane; and a parallel control means for driving the brake pressure adjusting means in such a direction that the distances detected by the distance detecting means coincide with set values while referring to the distances.

To accomplish the first and second objects, according to a second embodiment of the present invention, there is provided a parallel traveling control system, in addition to the functional components of the system in the first embodiment, further comprising: a wheel rotation detecting means for detecting a rotation of a steering wheel; and instructing means for designating automatic parallel traveling, characterized in that: a parallel control means initiates automatic parallel traveling to drive the brake pressure adjusting means in such a direction that the distance coincide with set values while referring to the distances detected by the distance detecting means when the instructing means designate automatic parallel traveling but stop automatic parallel traveling when the wheel rotation detecting means detects the rotation of the steering wheel.

The parallel traveling control system in the first embodiment functions as follows. The distance detecting means detect distances to the guide means provided on the road surface of the traveling lane or set in the vicinity of the road surface along the traveling lane. The parallel control means refers to the detected distances and works to drive the brake pressure adjusting means in such a direction that the distances become identical with the set values. The Brake pressure adjusting means behave to adjust the brake pressures of the bilateral wheel brakes.

With this arrangement, the brake pressures of the bilateral wheel brakes are adjusted to identify the distances to the guide means, which are detected by the distance detecting means, with the set values. The distances between the vehicle and the guide means are thus kept virtually constant.

In this manner, an adjustment of a direction in which the vehicle runs forwards to keep constant the distances between the vehicle and the guide means is effected by adjusting the pressures of the bilateral wheel brakes, whereby the steering wheel is not automatically rotationally driven for automatic parallel traveling control. The driver's strange feeling about the steerage is thus obviated.

The parallel traveling control system in the second embodiment exhibits the functions of the system in the first embodiment during a designation of automatic parallel traveling that is made by the instructing means. In addition to those functions, when rotationally driving the steering wheel, the wheel rotation detecting means detects the rotation thereof. The parallel control means stops automatic parallel traveling in response to this detection.

Hence, the driver, during automatic parallel traveling of the vehicle after the instructing means have designated automatic parallel traveling, rotationally drives the steering wheel to exit from the highway or make a change in course. At that time, automatic parallel traveling is automatically released, whereby the vehicle travels corresponding to the steering of the driver.

As described above, the automatic parallel traveling control is automatically released by the steering that the driver intends to perform without carrying out the releasing operations of returning the parallel traveling instruction switch to the open state where releasing is designated or putting the separately added release instruction switch into the closed state where releasing is instructed. Consequently, the burdens on the driver are reduced, and the course can smoothly be changed as the drivers intends.

BRIEF DESCRIPTION OF THE DRAWINGS

Other objects and advantages of the present invention will become apparent during the following discussion taken in conjunction with the accompanying drawings, in which:

FIG. 1b is a vertical sectional view depicting a construction of a pressure control valve device 3 shown in FIG. 1a;

FIG. 1d is a block diagram illustrating a construction of an electronic control unit 10 shown in FIG. 1a;

GENERAL DESCRIPTION OF ELEMENTS SHOWN IN THE FIGURES

Figure 1A:
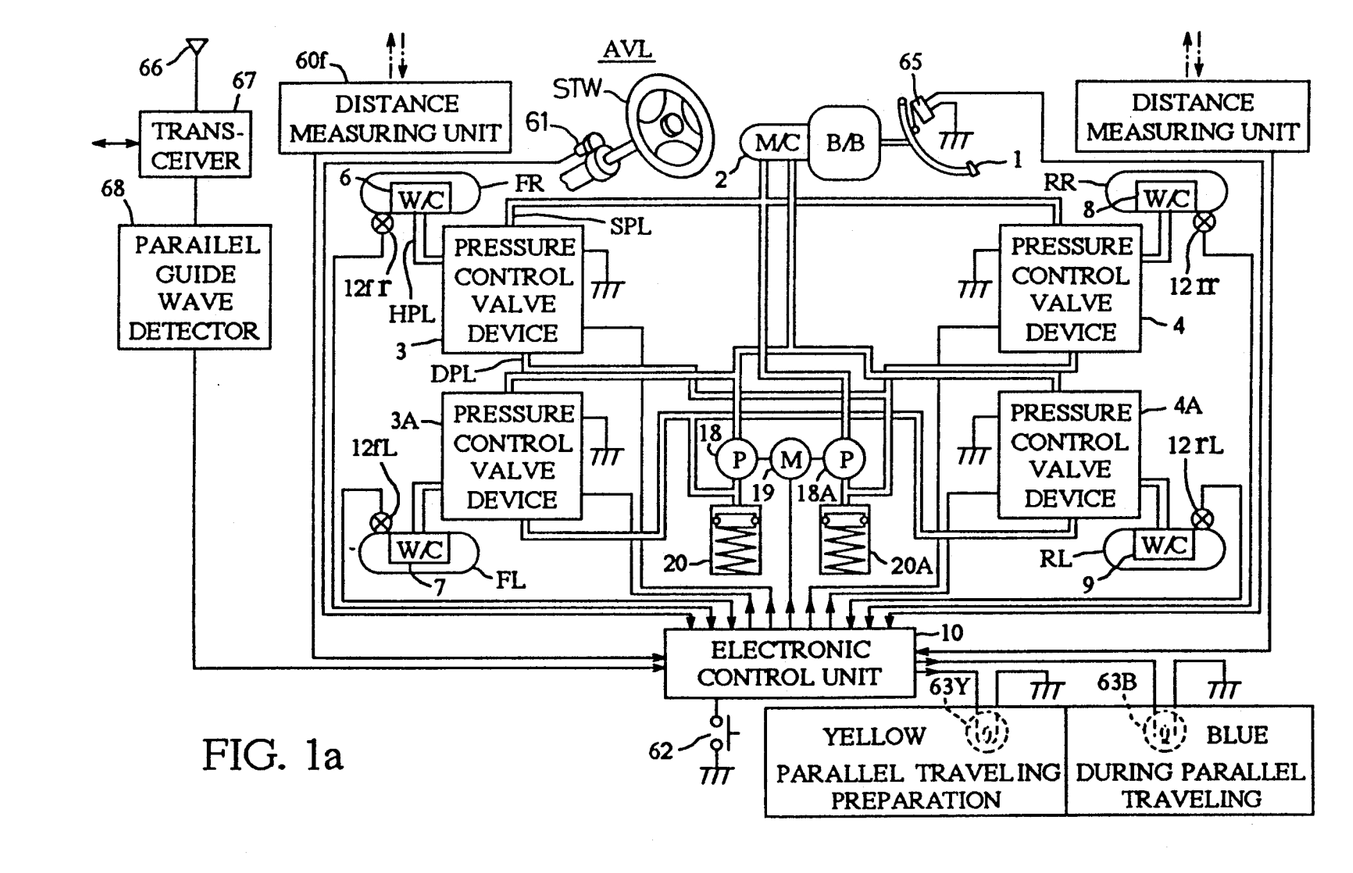
FIG. 1a is a block diagram illustrating an outline of construction of one embodiment of the present invention.
Figure 1B:
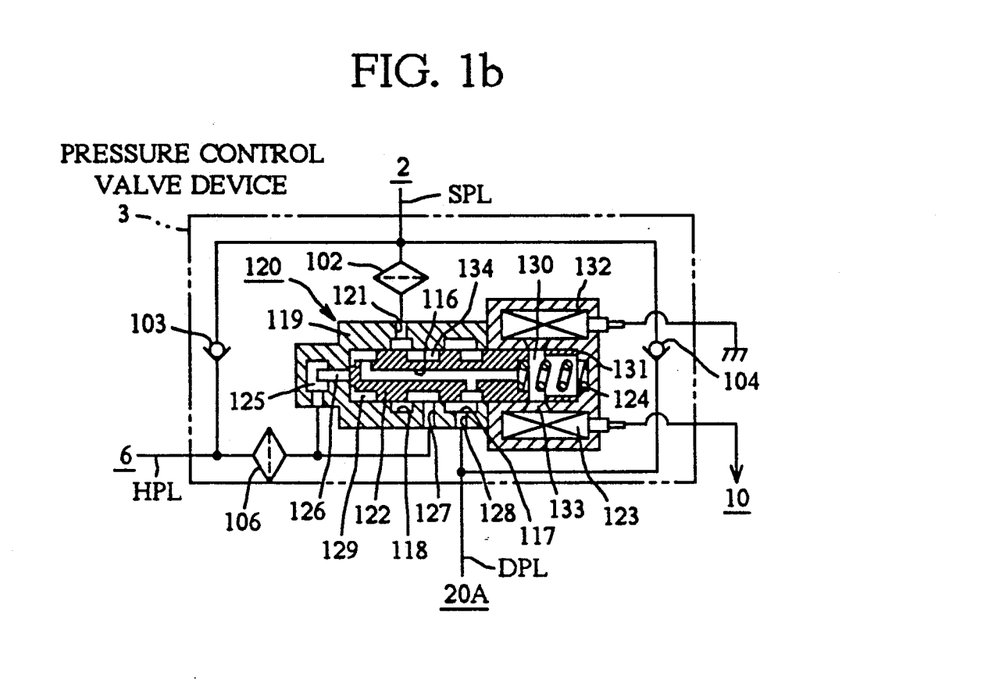
Figure 1C:
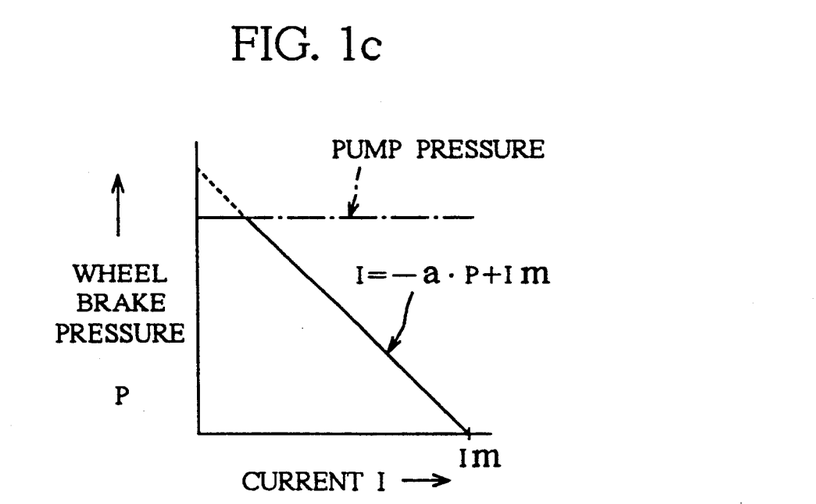
FIG. 1c is a graphic chart showing a relationship of an output pressure versus an electrification current value in association with a pressure control valve 120 illustrated in FIG. 1b.

FIG. 1a: 67 . . . transceiver, 68 . . . parallel guide wave detector, 60f . . . distance measuring unit, 3 . . . pressure control valve device, 3A, pressure control valve device, 10 . . . electronic control unit, 63Y . . . yellow, parallel traveling preparation, 63B . . . blue, during parallel traveling, 4A . . . pressure control valve device, 4 . . . pressure control valve device 60r . . . distance measuring unit FIG. 1b: 3 . . . pressure control valve device FIG. 1c: (a) pump pressure, (b) wheel brake pressure O, (c) current I FIG. 1d: 10 . . . electronic control unit, (a) input interface, (b) output interface, 22 . . . constant voltage circuit, 61 . . . steering angle sensor, 60r . . . distance measuring unit, 60f . . . distance measuring unit, 27 . . . differential circuit, 28 . . . absolute value circuit, 29 . . . integrating circuit, 35, 35A, 36, 36A . . . latch, 23 . . . decoder, 22 . . . data selector, 21 . . . driver, 12f, 12fL, 12rr, 12rL . . . Hall IC FIG. 2a: PO . . . Power supply ON, IZ . . . Initialization, TS . . . Start timer dt, IR . . . Input reading, PC . . . Parameter arithmetic, AC . . . Antiskid control, TC . . . Traction slip control, GC . . . Parallel control, OT . . . Output, OC . . . Timer dt over ?

Figure 2A:
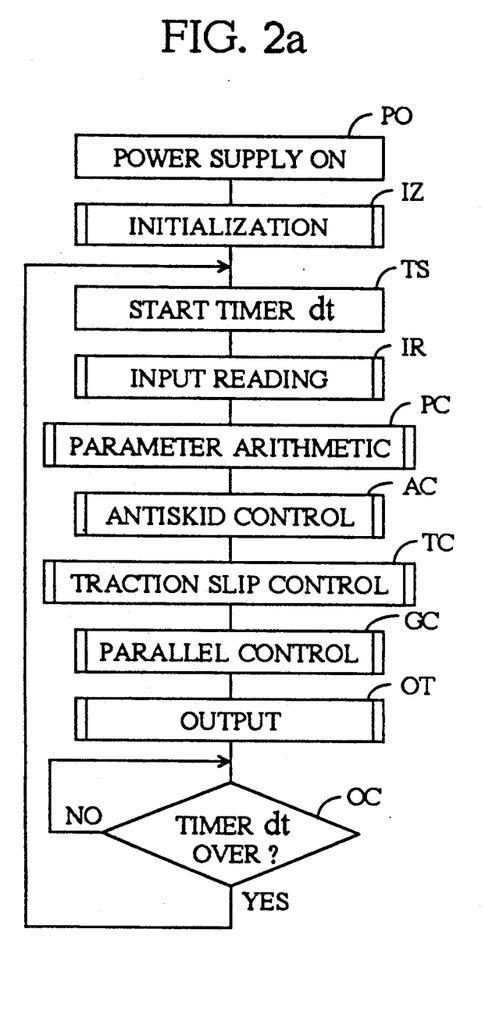
FIG. 2a is a flowchart showing control operations of a microprocessor 11 depicted in FIG. 1d.
Figure 2B:
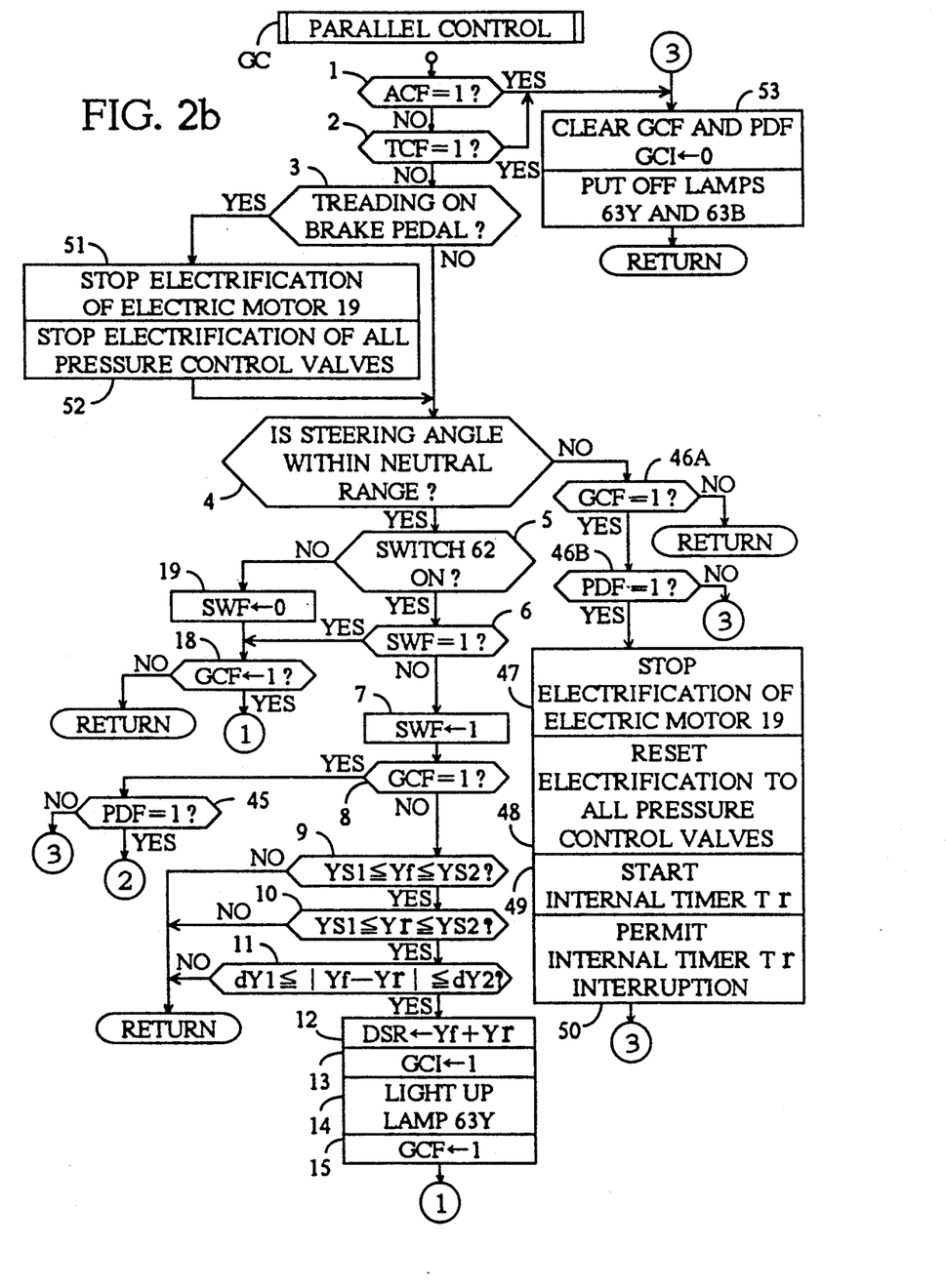
FIG. 2b is a flowchart showing control operations of microprocessor 11, depicted in FIG. 1d.
Figure 2C:
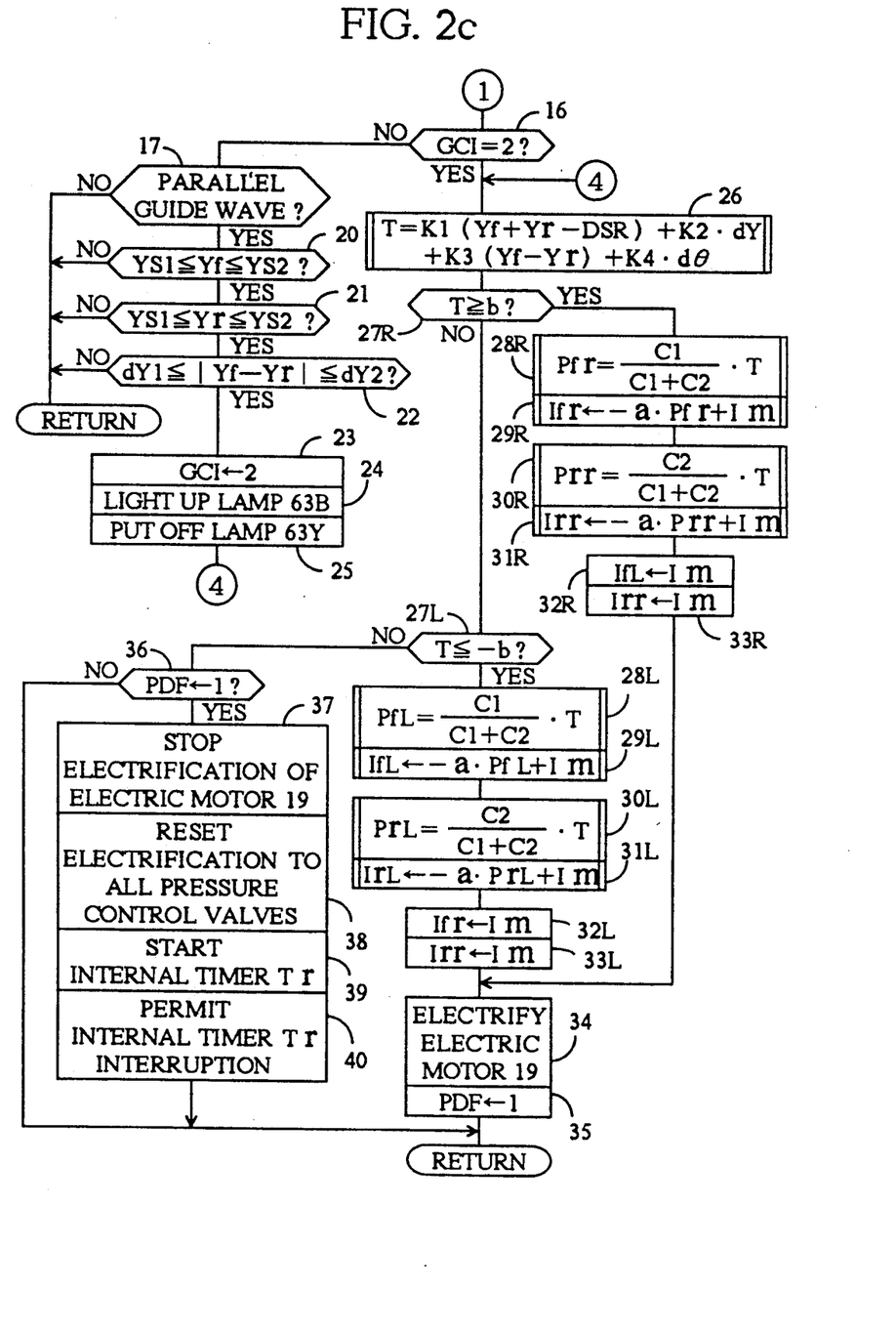
FIG. 2c is a flowchart showing control operations of microprocessor 11, depicted in FIG. 1d.
Figure 2D:
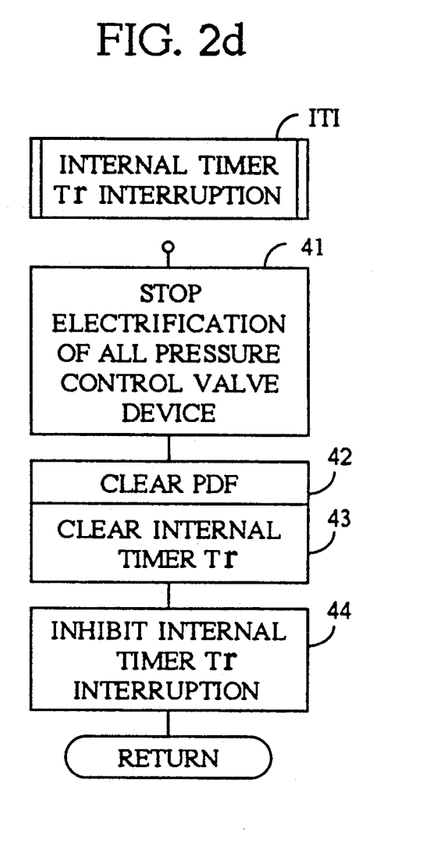
FIG. 2d is a flowchart showing control operations of microprocessor 11, depicted in FIG. 1d.

FIG. 2d: ITI . . . Internal timer Tr interruption, 41 . . . Stop electrification of all pressure control valve devices, 42 . . . Clear PDF, 43 . . . Clear internal timer Yr, 44 . . . Inhibit internal timer Tr interruption, (a) Return FIG. 2b: GC . . . parallel control, 3 . . . Treading on brake pedal ? 4 . . . Is steering angle within neutral range ?, 5 . . . Switch 62 ON ?, 14 . . . Light up lamp 63Y, (a) Return, (b) Return, 47 . . . Stop electrification of electric motor 19, 48 . . . Reset electrification to all pressure control valves, 49 . . . Start internal timer Tr, 50 . . . Permit internal timer Tr interruption, (c) Return, 51 . . . Stop electrification of electric motor 19, 52 . . . Stop electrification of all pressure control valves, 53 . . . Clear GCF and PDF, Put off lamps 63Y and 63B, (d) Return FIG. 2c: 17 . . . Parallel guide wave ?, 24 . . . Light up lamp 63B, 25 . . . Put off lamp 63Y, 37 . . . Stop electrification of electric motor 19, 38 . . . Reset electrification to all pressure control valves, 39 . . . Start internal timer Tr, 40 . . . Permit internal timer Tr interruption, 34 . . . Electrify electric motor 19, (a) Return, (b) Return, FIG. 3: (a) sideway wind FIG. 4: (a) sideway wind.

DESCRIPTION OF THE PREFERRED EMBODIMENTS

Turning first to FIG. 1a, there is illustrated one embodiment of the present invention. In accordance with this embodiment, under automatic parallel traveling control, antiskid control and traction slip control as well, brake pressures of wheel brakes 6, 8, 7 and 9 are respectively set by pressure control valve devices 3, 4, 3A and 4A. An electronic control unit 10 serves to effect the automatic parallel traveling control, the antiskid control and the traction slip control.

If any one of the automatic parallel traveling control, the antiskid control and the traction slip control is not executed, and when a driver treads on a brake pedal 1, brake pressures corresponding to a treading quantity are applied via the pressure control valve devices 3, 3A, 4 and 4A to a brake 6 of a front right wheel FR, a brake 7 of a front left wheel FL, a brake 8 of a rear right wheel RR and a brake 9 of a rear left wheel.

The pressure control valve devices 3, 3A, 4 and 4A, when electric coils thereof are charged with no electricity, connect the wheel brakes 6 through 9 to a brake pressure output port of a brake master cylinder 2, with which high pressure output (discharge) ports of pumps 18 and 18A each driven by an electric motor 19. Reservoirs 20 and 20A are connected to low pressure output (suction) ports of the pumps 18 and 18A. The pressure control valve devices 3, 3A, 4 and 4A, when electrifying electric coils thereof, impart brake pressures inversely proportional to the current values to the wheel brakes 6 and 7. The brake pressures are obtained on the basis of the current values of the electric coils, an output pressure of the brake master cylinder 2, discharge pressures (both of them are high) of the pumps 18 and 18A and suction pressures (drain pressures) of these pumps.

On electrifying the electric motor 19, the pumps 18 and 18A are driven, with the result that brake oil of the reservoir 20A is sucked by the pump 18A and fed to the third pressure control valve device 4 as well as to the first pressure control valve device 3. Brake oil of the reservoir 20 is sucked by the pump 18 and supplied to the fourth pressure control valve device 4A as well as to the second pressure control valve device 3A.

The numbers of revolutions of the front right wheel FR, the front left wheel FL, the rear right wheel RR and the rear left wheel RL are detected by means of speed sensors 12fr, 12fL, 12rr and 12rL.

Connected to the electronic control unit 10 are the electric coils of the first, second, third and fourth presure control valve devices 3, 3A, 4 and 4A, the electric motor 19 and the speed sensors 12fr through 12rL.

Figure 3:
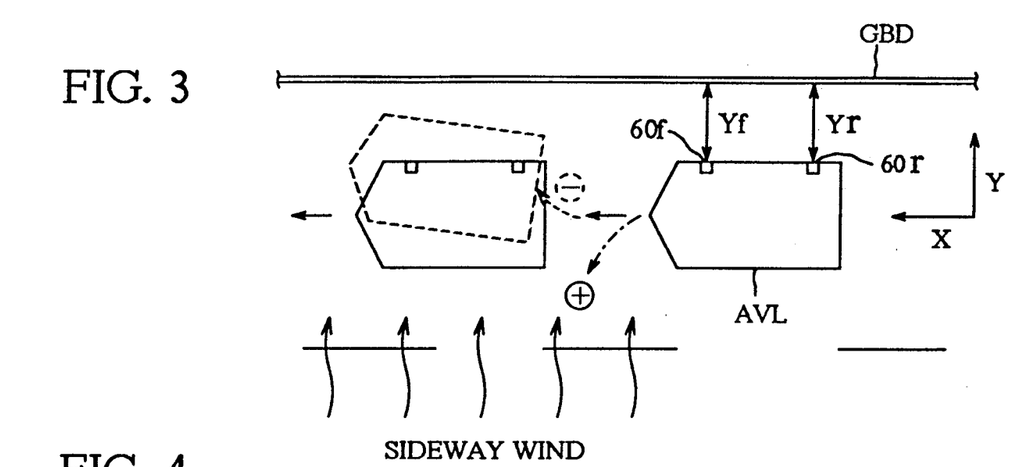
FIG. 3 is a block diagram in plan, illustrating a state where a vehicle AVL shown in FIG. 1a travels on a maximum speed traveling lane of a highway.

Mounted on front and rear right side surfaces of the vehicle are ultrasonic distance measuring devices 60a and 60r for measuring, as illustrated in FIG. 3, distances Yf and Yr between the measuring devices 60f and 60r and a guide board GBD provided in place of a central separating zone of the highway and transmitting analog signals indicating distance values to the electronic control unit 10.

Figure 4:
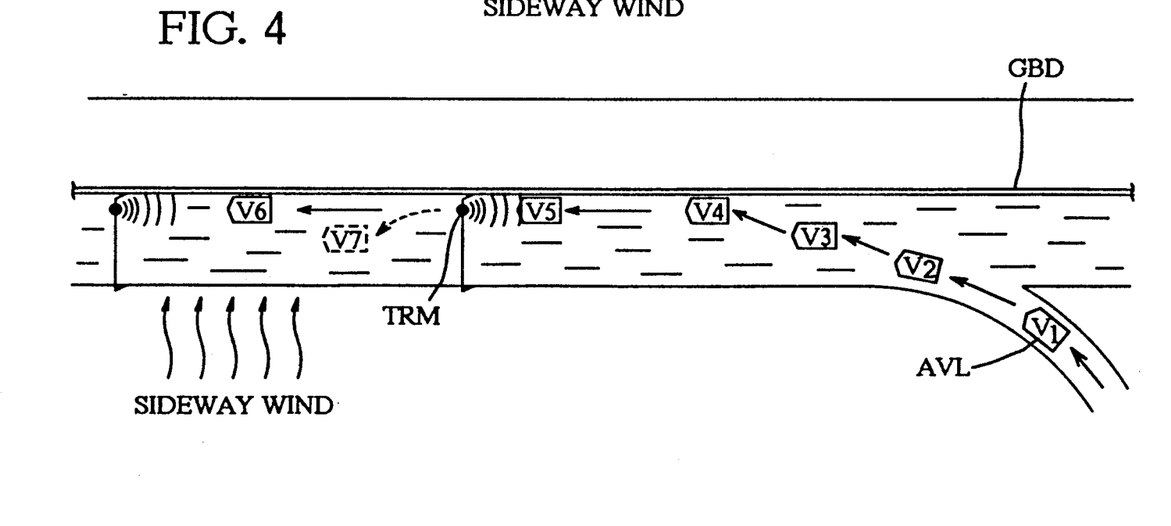
FIG. 4 is a block diagram in plane, showing a course in which the vehicle AVL shown in FIG. 1a enters the maximum speed traveling lane of the highway from an entrance path and travels afterwards.

Referring to FIG. 4, a transmitter TRM for transmitting parallel traveling guide waves to predetermined positions is installed above an outrunning lane closest to the guide board GBD of the highway. The transmitter TRM constantly transmits radio waves of a given frequency in the direction of the maximum speed traveling lane.

Referring again to FIG. 1a, on the vehicle a parallel guide wave detector 68 is connected to a receiver of a transceiver 67 connected to an antenna 66. The detector 68 detects the parallel traveling guide waves from the waves received and supplies detection signals to the electronic control unit 10.

Joined to a steering shaft of the steering wheel STW is a steering angle sensor 61 composed of a potentiometer and a speed reducer for converting, into a turn smaller than one rotation, several rotations of the steering wheel STW from a right turn maximum rotational angle to a left turn maximum rotational angle. The sensor 61 works to generate an intermediate voltage assuming a predetermined level when the steering wheel STW is in a neutral position, a predetermined minimum voltage when the wheel STW is at the right turn maximum rotational angle, and a predetermined maximum voltage when the wheel STW is at the left turn maximum rotational angle, these voltages being imparted to the electronic control unit 10.

The pressure control valve devices 3, 3A, 4 and 4A, as will be explained later, supply the respective wheel brakes 6, 7, 8 and 9 with brake pressures inversely proportional to electrification current values thereof. A according as the electrification current values increase, conduction ratios between the wheel brakes and the reservoirs 20 and 20A (roughly a drain pressure: a base low pressure) rise, whereas the brake pressures of the wheel brakes decrease.

During the automatic parallel traveling control, however, as indicated by a dotted line of FIG. 3, if the vehicle deviates rightwards on receiving, e.g., a sideway wind, the electronic control unit 10 applies the brake pressures to the left wheel brakes 7 and 9 but no brake pressure to the right wheel brakes 6 and 8 in order to keep constant distances between the vehicle and the guide board GBD. This operation involves preparatory steps of driving the pumps 18 and 18A by charging the motor 19 with electricity, setting the electrification currents of the pressure control valve devices 3A and 4A at a low level (application of brake pressures) and those of the pressure control valve devices 3 and 4 at a high level (release of brake pressures), and setting electrification current values of the pressure control valve devices 3A and 4A in inverse proportion to an amount of deviation of the vehicl (the brake pressures are set in proportion to the amount of deviation thereof). Under these conditions, even when the driver treads on the brake pedal 1 for braking, it follows that effects of the wheel brakes 6 and 8 are not virtually developed, because the wheel brakes 6 and 8 are connected via the pressure control valve devices 3 and 4 to the reservoir 20A. To prevent this phenomenon, a switch 65 as an additional component is connected to the electronic control unit 10, the switch 65 changing from an open state to a closed state by treading on the brake pedal 1. The electronic control unit 10 cuts off the electrification of the whole pressure control valve devices 3, 4, 3A and 4A during a period for which the switch 65 is changing from the open state to the closed state upon treading on the brake pedal 1. The electronic control unit 10 at the same time shuts off the conduction between the wheel brakes 6 through 9 and the reservoirs 20 and 20A but connects these brakes 6 through 9 to the master cylinder 2.

Turning to FIG. 1b, there is illustrated a construction of the first pressure control valve device 3. The device 3 is constructed mainly of an electromagnetic valve 120. To start with, a descriptive emphasis will be placed on this valve 120. A spool 122 of the electromagnetic valve 120 is formed of a magnetic substance reciprocates (moves right and left) an internal space of a case member 119. An inner surface of the case member 119 is chased with a annular conduction groove 118 communicating with a first input port 121. An annular conduction groove 117 is formed apart from the groove 118 in the case member 119, the groove 117 communicating with a second input port 128.

A side peripheral surface of the magnetic spool 122 is formed with an annular groove 134 conductible to the conduction grooves 117 and 118 and substantially middled therebetween. A width of the conduction groove 134 is set equal to a distance between the conduction grooves 117 and 118. The groove 134 communicates with an output port 127.

When the spool 122 is, as illustrated in FIG. 1b, in a left limit position (a first position), the grooves 118 and 134 are partially overlapped with each other. The first input port 121 (brake pressure) communicates via those grooves with the output port 127, but the groove 134 is not overlapped with the groove 117. Hence, a communication between the second input port 128 (drain pressure) and the output port 127 is cut off, and an output pressure of the master cylinder 2 or a discharge pressure of the pump 18A is thereby conveyed directly to the wheel brake 6. A boosting velocity (a pressure increasing velocity of the wheel brake 6) reaches its maximum. When the spool 122 moves to the right, the superposition of the groove 118 on the groove 134 becomes small, thereby decreasing the boosting velocity. At a point where the groove 134 is not overlapped with any one of the grooves 117 and 118, the communication of the output port 127 with both of the first input port 121 and the second input port 128 is cut off (hold), in which state the wheel brake pressures do not vary.

When the spool 122 moves right, the groove 134 is overlapped with the groove 117, while the output port 127 is cut off from the first input port 121 but communicates with the second input port 128 (depressurization). A depressurizing velocity (a pressure reducing velocity of the wheel brake 6) increase with righter movements. The right movement of the spool 122 is restricted by a stopper 131. The depressurizing velocity reaches its maximum in a right limit position (a second position) in which the right end of the spool 122 impinges on the stopper 131.

Therefore, as the spool 122 by and by moves from the first position (left limit position) depicted in FIG. 1b towards the above-mentioned second position (right limit position), the brake pressure of the wheel brake 6 escalates from a high boosting velocity, i.e., [boosting], to a low boosting velocity, and assumes a state of [hold] at a certain point. The brake pressure is then brought into a state of [depressurizing] of a low depressurizing velocity and gradually comes to have a high depressurizing velocity.

The spool 122 is biased leftwards by means of a compression coil spring 124. A left end of the case member 119 is bored with a hole, a left portion of which is formed with an output action chamber 125. Inserted into this hole is a plunger 126 penetrating a spool operation space from the output action chamber 125.

The output action chamber 125 communicates with the output port 127. A right spring accommodating space 130 of the spool 122 communicates via a conduction hole 116 led to the second input port 128 with a left plunger protrusion space 129 thereof so as not to hinder the spool 122 from being driven by the spring 124 and the electric coil 123. More specifically, the plunger protrusion space 129 is under a drain pressure, and therefore the pressure of this space 129 does not interfere with the right movement of the spool 122 by use of the plunger 126. When boosting a pressure of the output port 127, a pressure of the output action chamber 125 also rises, thereby pushing the plunger 126 rightwards. As a result, the spool 122 undergoes the pressure of the output port 127 as a rightward driving force through the plunger 126 as well as through the output action chamber 125. At the predetermined highest level of the wheel brake pressure, however, a leftward driving force given by the spring 124 is greater than that, and hence the spool 122 remains in the first position depicted in FIG. 1b irrespective of a magnitude of the wheel brake pressure during non-electrification of the electric coil 123.

Fixed to the right end of the case member 119 is a yoke 132 incorporating the electric coil 123. A substantially intermediate portion, on which the electric coil 123 is wound, of an inner cylindrical member of the yoke 132 is ruptured in a ring-like configuration adaptive to mount a non-magnetic ring 133. When electrifying the electric coil 123, a magnetic flux circumfluent along the electric coil 123 and interlinking therewith is generated in the hollow cylindrical ring-like yoke. A part of the magnetic flux expands in a direction of axial core of the yoke 132 at the non-magnetic ring 133, and thereby magnetic attraction for driving the magnetic spool 122 rightwards acts on this spool, thus driving the spool 122 to the right-hand.

In the case of charging the electric coil 123 with no electricity, and when the spool 122 is in the first position illustrated in FIG. 1b, the master cylinder 2 produces a brake pressure of a certain magnitude on treading down the brake pedal 1. At this moment, the brake oil flows from the master cylinder 2 to the wheel brake 6 sequentially via a filter 102, the first input port 121, the grooves 118 and 134, the output port 127 and a filter 106, whereby a brake pressure of the wheel brake 6 rises. since the grooves 118 and 134 are superposed on each other at the maximum, a boosting velocity of brake pressure of the wheel brake 6 comes to its maximum.

When releasing the brake pedal 1, the brake master cylinder 2 exerts a negative pressure on the first input port 121, while the brake oil of the wheel brake 6 returns to the master cylinder 2 sequentially via the filter 106, the output port 127, the grooves 134 and 118, the first input port 121 and the filter 102. During a period for which a difference between the pressure of the wheel brake 6 and that of the master cylinder 2 continues to be larger than a predetermined value, the brake oil of the wheel brake 6 returns to the master cylinder even through a nonreturn valve 103.

The master cylinder 2 generates a certain brake pressure by treading on the brake pedal 1, and the pressure of the wheel brake 6 increases to some extent while the wheel FR receives a braking force. At this time, when electrifying the electric coil 123, the spool 122 moves right corresponding to a current value. In the meantime, a proportion of superposition of the groove 134 on the groove 118 is reduced. When the pressure of the wheel brake 6 is lower than an output pressure of the master cylinder 2 (in the course of boosting the brake pressure), an increasing velocity of the wheel brake 6 drops down. When the grooves 134 and 117 start overlapping after the superposition of the groove 118 on the groove 134 has disappeared, the drain pressure acts on the output port 127, with the result that the pressure of the wheel brake 6 begins to decrease. A decreasing velocity depends on a proportion of superposition of the groove 134 on the groove 117. When the pressure of the output port 127 drops down, a force by which the plunger 126 pushes the spool 122 rightwards is reduced, thereby decreasing the rightward driving forces (an electric coil 123 driving force plus a plunger 126 driving force) acting on the spool 122. The spool 122 stops in a position where the rightward driving forces equilibrate with leftward driving force given by the compression coil spring 124, i.e., a position corresponding to the current value of the electric coil 123. Therefore, the pressure of the output port 127 (the wheel brake 6), as illustrated in FIG. 1c, exhibits a value inversely proportional to the current value of the electric coil 123. During the above-described depressurization, the brake oil runs from the wheel brake 6 to an accumulator 20A sequentially via the filter 106 and the output port 127.

The filter 102 functions to block permeation of dusts into the electromagnetic valve 120, which exist in the brake oil supplied from the master cylinder 2 to the wheel brake 6. The filter 106 serves to hinder the permeation of dusts into the electromagnetic valve 120, which are contained in the brake oil returned from the wheel brake 6 to the master cylinder 2. These filters are incorporated so as not to cause a deterioration in operation of the electromagnetic valve 120.

The nonreturn valve 103 shuts off the conduction of brake oil from the master cylinder 2 to the wheel brake 6 but permits the conduction from the latter to the former. The nonreturn valve 103 works, when the brake pressure of the master cylinder 2 decreases (the brake pedal 1 is released), to immediately feed the brake oil of the wheel brake 6 back to the master cylinder 2 and to make the wheel brake pressure releasable if the electromagnetic valve 120 encounters the operating deterioration.

A nonreturn valve 104, which blocks the conduction of brake oil from the master cylinder 2 to the drain pressure side (the second input port 128) but permits the conduction from the latter to the former, behaves to return the brake oil of the accumulator 20A to the master cylinder 2 during the depressurization. Note that the above-described [depressurization] is effected when driving the pumps 18 and 18A. The brake oil of the accumulator 20A is returned to the master cylinder 2 by means of the pump 18A, so that oil returning through the nonreturn valve 104 is developed when the brake oil having a base pressure or above still remains in the accumulator 20 on the occasion of a stoppage of the pump 18 or when the operating deterioration can be seen in the pump 18A.

The description given above has dealt with both the construction and the operation of the first pressure control valve device 3. Constructions and operations of the second, third and fourth pressure control valve devices 3A, 4 and 4A are much the same as those of the first device 3.

Figure 1D:
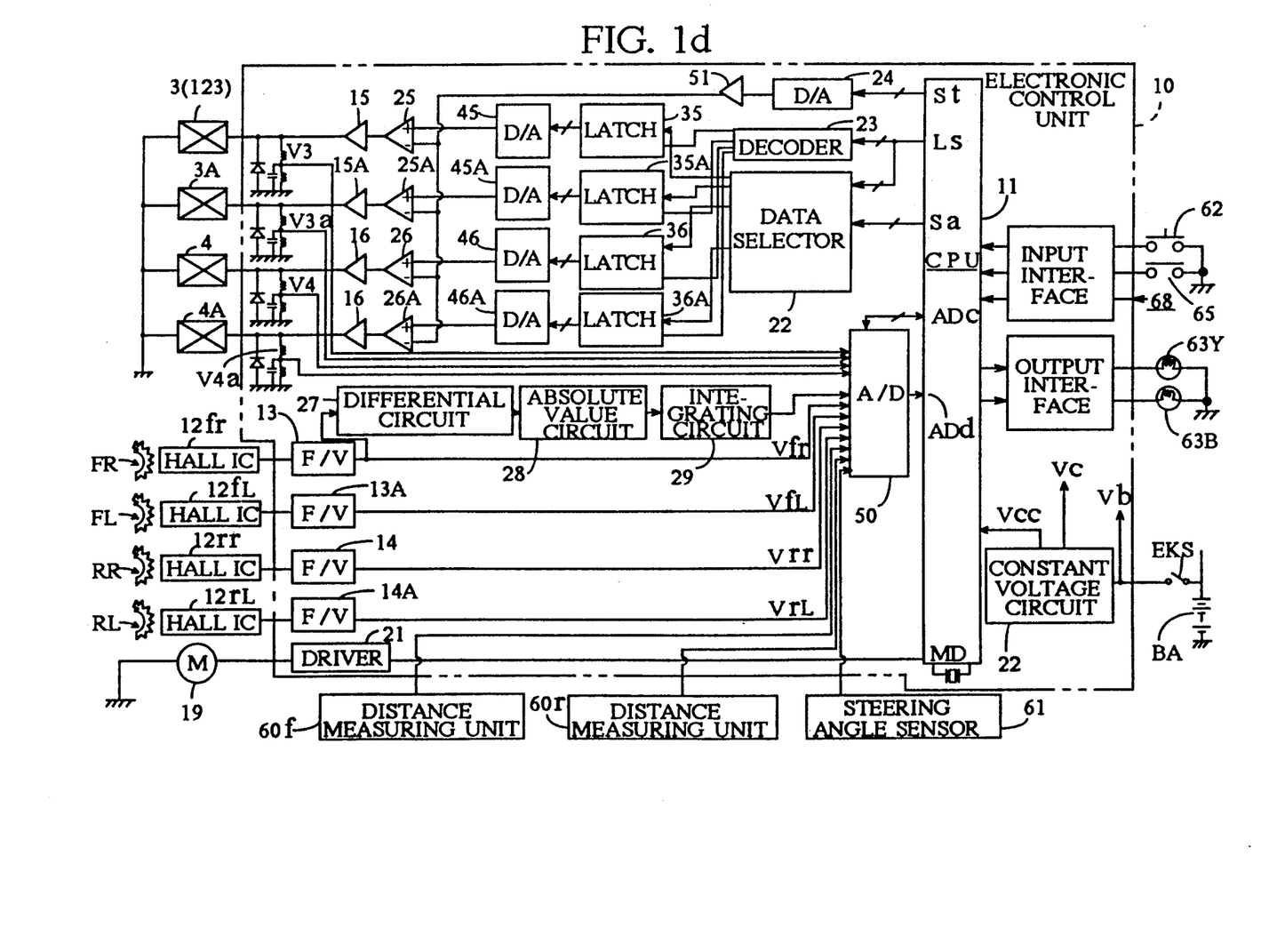

FIG. 1d illustrates a configuration of the electronic control unit 10 of FIG. 1a. The speed sensors 12fr to 12rL may be conceived as Hall ICs (each including a Hall element for detecting a magnitude of a magnetic field and a binary-coded circuit for binary-coding detection signals). The speed sensors generate electric pulses having a frequency proportional to a rotational speed of a geared permanent magnet ring connected to a wheel shaft in response to the rotation of this magnet ring. The electric pulses are imparted to F/V converters 13, 13A, 14 and 14A. The F/V converters 13, 13A, 14 and 14A generate voltages assuming levels proportional to frequencies of input electric signals, which are in turn given to an A/D converter 50.

The motor 19 is charged with electricity from the motor driver 21 to which a microprocessor (hereinafter referred to as a CPU) 11 gives an instruction of electrification.

(Electric coils of) the first through fourth pressure control valve devices 3, 3A, 4 and 4A are electrified by amplifiers (current control solenoid drivers) 15, 15A, 16 and 16A, and electrification current values are designated in accordance with outputs of adders 25, 25A, 26 and 26A. D/A converters 45, 45A, 46 and 46A transmit signals (current target values: analog conversion signals of arithmetic values) for designating current values to one input ends of the adders 25, 25A, 26 and 26A. Transmitted from a D/A converter 24 via a level adjusting amplifier 51 to the other ends thereof are signals for indicating current adjustment values corresponding to vehicle-speed-correspondence brake pressure adjustment values substantially proportional to the vehicle speeds.

The adders 25, 25A, 26 and 26A generate signals proportional to [the current target values+the current adjustment values corresponding to the vehicle speeds] to supply the amplifiers 15, 15A, 16 and 16A with these signals. Therefore, the amplifiers 15, 15A, 16 and 16A charge (the electric coils of) the first through fourth pressure control valve devices 3, 3A, 4 and 4A with electric currents proportional to [the current target values+the current adjustment values corresponding to the vehicle speeds]. The pressure control valve devices 3, 3A, 4 and 4A impart brake pressures inversely proportional to the electrification current values to the wheel brakes, and it follows that the wheel brake pressures becomes those that are in reverse proportion to [the current target values+the current adjustment values corresponding to the vehicle speeds]. Note that the electric current required for driving the spool 122 in the second position (right limit position) may be an upper limit of the electricity with which the pressure control valve devices 3, 3A, 4 and 4A are charged. These pressure control valve devices are not electrified, if the values given by [the current target values+the current adjustment values corresponding to the vehicle speeds] are negative. Namely, the amplifiers 15, 15A, 16 and 16A are defined as limit amplifiers.

Latches 35, 35A, 36 and 36A serve to latch data indicating the target current values given from a CPU 11 via a data selector 22, and the latched data are sent to the D/A converters 45, 45A, 46 and 46A. Given from the CPU 11 to the D/A converter 24 are the current adjustment values (assuming a high lever in the case of a high vehicle speed but a low level in the case of a low vehicle speed) proportional to the vehicle speeds.

Voltages V3, V3a, V4 and V4a (feedback voltages) representing the electrification current values of the electric coils of the first through fourth control valve devices 3, 3A, 4 and 4A are inversely proportional to the wheel brake pressures. These voltages are also imparted to the A/D converter 50.

A voltage indicating a rotational speed (peripheral speed) of the wheel FR is given to a differential circuit 27 which in turn generates a signal indicating a rate of variation thereof (positive: increasing speed, negative: decreasing speed). An absolute value circuit 28 generates a voltage which shows an absolute value (full-wave rectification value) of the rate-of-variation signal, and an integrating circuit 29 integrates the absolute value voltage. The integrated voltage is supplied to the A/D converter 50. The integrated voltage corresponds to ruggedness on the road surface and is employed for judging conditions, good or bad, of the road surface under the traction slip control as well as under the antiskid control.

Connected via an engine key switch EKS to a battery BA mounted on the vehicle is a constant voltage circuit 22 which imparts necessary voltages to the respective components of the electronic control unit 10.

Referring to FIGS. 2a to 2c, there are shown control operations of the CPU 11. In this embodiment, the CPU 11 performs the antiskid control, traction slip control and automatic parallel control. To be more specific, the CPU 11 judges a traveling condition of the vehicle and relieves (depressurization) the wheel brake pressure to reduce, if increased, a factor of slipping of the wheels just when braking is effected. If the factor of slipping thereof increases during an acceleration, the CPU 11 executes the traction slip control intended to augment the wheel brake pressures for the purpose of reducing the increased factor. Where any one of the antiskid control and the traction slip control is executed, and so far as predetermined requirements are established, the parallel control is effected. In all these three types of control processes, a necessary brake pressure is arithmetically obtained per wheel brake, and an electrification current value which brings about the pressure needed is then calculated. Data indicating these values are set to the latches 35 through 36A.

Turning first to FIG. 2a, when making a current of a power supply (a step PO: hereinafter in the brackets, the terms "steps" or "subroutines" are omitted, and instead the symbols indicating these terms are used for representation), the CPU 11 initializes the output (the output which brings about a stopping state during a standby is set: the operation is to clear the output to 24, the latches 35, 35A, 36 and 36A, the outputs to lamps 63Y and 63B and also the output to the driver 21), and then clears an internal register, a counter and a timer (IZ). Subsequently, a timer (program timer) dt for taking a time interval dt is started (TS), and an input is read (IR). Pieces of information to be read include electrification current values (feedback values: common to the antiskid control, traction slip control and parallel control) of the pressure control valve devices 3, 3A, 4 and 4A, output voltages of the integrating circuit 29 which indicate high/low vibrations (referred only under the antiskid control and traction slip control) associated with the wheel velocities, wheel rotational speeds (common to the antiskid control, traction slip control and parallel control), distances (referred only under the parallel control) detected by the distance measuring units 60f and 60r, a rotary angle (referred under the parallel control alone) of the steering wheel, a signal (referred under the parallel control alone) of a switch 65 which indicates treading or non-treading on the brake pedal, opening (not instructed: releasing is instructed)/closing (instructed: referred only under the parallel control) states of a parallel traveling instruction switch 62, and detection or non-detection (referred only under the parallel control) of the parallel guide waves.

The CPU 11 next calculates parameters that are referred under the antiskid control, traction slip control and parallel traveling control. A typical parameter may be an estimated vehicle speed which will be obtained by adding the wheel velocities (outputs of 13, 13A, 14 and 14A). A factor of slipping of the wheel is computed on the basis of a rotational speed of each wheel and the estimated vehicle speed. As parameters for [parallel traveling] control, there are calculated a sum (Yf+Yr) of measured distances Yf and Yr as well as a difference therebetween (a deviation in the advancing direction: Yf−Yr), an amount of variation in the measured distances (that is obtained by subtracting (Yf+Yr) given last time from (Yf+Yr) given this time), and an amount of variation in deviation in the advancing direction (that is obtained by subtracting (Yf−Yr) given last time from (Yf−Yr) given this time).

The CPU 11 subsequently executes a subroutine of [antiskid control] (AC) and judges a necessity or unnecessity for the antiskid control. If necessary, the antiskid control is initiated (starting from a reduction of the pressure of a certain wheel brake—i.e., a corresponding pressure control valve device is electrified, while other valve devices are charged with no electricity). Once the initiation is performed, a piece of information ([1]) indicating that the antiskid control is being carried out is held in a register ACF till the antiskid control comes to an end. Whereas in effecting no antiskid control, a content of the register ACF is [0].

The CPU 11 then executes a subroutine of [traction slip control] (TC) and judges a necessity or unnecessity for the traction slip control. If necessary, the traction slip control is started (starting from the operations of driving the pumps 18 and 18A by electrifying the electric motor 19, impressing the brake pressure while charging the pressure control valve device corresponding to a certain wheel brake with no electricity and impressing no brake pressure while changing other pressure control valve devices with electricity). Upon a start of the traction slip control, a piece of information ([1]) showing that the traction slip control is being executed is held in a register TCF till the control is finished. Whereas if the traction slip control is not effected, a content of the register TCF is [0].

The CPU 11 executes a subroutine of [parallel control] (AC), a content of which will be described later with reference to FIGS. 2b and 2c.

The CPU 11 subsequently carries out a subroutine of the [output] (OT). When executing any one of the antiskid control, traction slip control and parallel control, at the stage of [output] (OT) data on the feedback current values are at first referred to the data latched into the latches 35, 35A, 36 and 36A and also outputted to an output port St under the control thereof for the purpose of judging electrifying conditions, normal or abnormal. If judged to be abnormal, the brake pressure control is halted (all the electrification instruction values are set to zero). If normal, to the latches 35, 35A, 36 and 36A there are update-outputted the target current value data catered for the respective wheel brakes, the data being calculated for the control (any one of the antiskid control, traction slip control and parallel control) that is on the execution. The current adjustment value data corresponding to the vehicle speeds (estimated vehicle speeds) are update-outputted to the output port St.

The CPU 11 the checks whether the timer dt is time-over or not. If not time-over, the task is to wait for time-over (OC). Whereas if time-over, the timer dt is started (TS). Subsequently, as illustrated in FIG. 2a, the operations come round this loop: subroutine IR-PC-AC-TC-GC-OT-step OC-TS-subroutine IR- . . . The operations are thus repeated along the above-mentioned loop. Therefore, attention is to be concentrated on such a point that the CPU 11 moves to a subroutine GC of [parallel control] virtually at a cycle dt.

Turning next to FIGS. 2b and 2c, a description will be given of operations of the driver and contents of [parallel control] (GC) corresponding thereto.

(1) Instruction of [parallel traveling] by the driver:

For instance, as illustrated in FIG. 4, a vehicle AVL enters the highway from an entrance path and passes over positions V1, V2 and V3. The vehicle AVL then comes into a maximum speed lane closest to a guide board GBD, and the driver, it is assumed, closes the parallel traveling instruction switch 62 in a position V4 of the maximum speed lane in a state where both the antiskid control and the traction slip control are effected without braking.

The CPU 11 writes, responding to closing of the switch 62, [1] indicating an ON-state of the switch 62 to a register SWF and checks (9, 10) whether or not the distances Yf and Yr measured by the distance measuring units 60f and 60r fall within a range defined by fixed values Ys1 and Ys2 (values set in the CPU 11 of the basis of a program). If not beyond the range, there is checked (11) whether or not a difference between the measured distances Yf and Yr (a deviation in the advancing direction of the vehicle AVL from the guide board GBD) fall within a range defined by fixed values dY1 and dY2 (values set in the CPU 11 on the basis of the program). If they are within the range, (Yf+Yr) is written to a reference value register DSR (12: setting of a reference value), and [1] indicating a completion of preparation for parallel traveling is written (13) to a register GCT. Subsequently, a lamp 63Y is lit up (14), and [1] indicating a completion of setting of the reference value is written (15) to a register GCF. The lamp 63Y, when being lit up, illuminates an internal surface of a display panel assuming a semi-transparent yellow color. The yellow display panel is thus brightened, and characters [parallel preparation] appear thereon. The representation of [parallel preparation] implies that a present distance given by (Yf+Yr) to the guide board GBD has been set as a parallel reference value (the operations given above correspond to 1 through 15 of FIG. 2b). It is to be noted that if at least one of the measured distances Yf and Yr deviates from a predetermined range prescribed by Ys1 and Ys2, or if a difference (Yf−Yr) between the measured distances Yf and Yr deviates from a range of deviation in the advancing direction that is prescribed by dY1 and dY2, the operation reverts to a main routine (FIG. 2a) (moves to the subroutine OT), passing through [parallel control] (GC) with no execution of setting of the above-mentioned reference value.

When the operation moves again to [parallel control] (GC), and if the instruction switch 62 is still closed in continuation from the last time, the operation moves to steps 1 through 6. Since closing of the switch 62 has already been detected (a content of the register SWF is 1), however, the operation jumps from the step 6 to a step 18 at which a content of the register GCF is checked. If setting of the reference value has previously finished, the register GCF's content being 1, whether or not a content of a register GCI is 2 (during an execution of parallel control) is checked at a step 16 shown in FIG. 2c. If not (during a parallel preparation after setting of the reference value has been finished), there is checked (17) whether the parallel guide waves are detected or not. If not, the operation returns to the main routine, passing through [parallel control] (GC). When the switch 62 reverts to an OFF-state (open), the register SWF is cleared (19) on proceeding to [parallel control] (GC). However, a state where the reference value is set remains as it is, and whether the parallel guide waves are detected or not is checked (1 to 5-19-18-16-17). If not detected, the operation goes back to the main routine, skipping over [parallel control] (GC).

The CPU 11 functions in the manner described above, and hence, when performing automatic parallel traveling, the driver moves forward to the maximum speed traveling lane closest to the guide board GBD. Subsequently, the driver drives the vehicle to travel substantially at the center of the lane, keeping the parallelism with the guide board GBD. and may momentarily close the parallel traveling instruction switch 62 (depressed at a touch). When closed, and if the distances Yf and Yr between the vehicle and the guide board fall within a set range and a deviation angle given by (Yf−Yr) from the parallelism in the advancing direction of the vehicle along the guide board GBD likewise falls within a set range, (Yf+Yr) of that moment is set as a distance reference value in the register DSR of the CPU 11. In the wake of this process, the lamp 63Y is lit up to illuminate the yellow display panel, thus displaying [parallel preparation].

When the switch 62 is closed, no reference value is set and the lamp 63Y does not brighten in cases where at least one of the distances Yf and Yr between the vehicle and the guide board GBD deviates from the set range; or alternatively, the deviation angle (yf−Yr) is beyond the set range. The driver is required to momentarily close the switch 62 once again by depressing it at a touch. (2) Start of [parallel traveling]:

As discussed above, the vehicle AVL approaches the parallel traveling guide wave transmitter TRM in a state where the reference value is set (GCF=1, GCI=1), and the parallel guide wave detector 68 detects the guide waves. At this time, the CPU 11A detects this when moving again to [parallel control] (GC) and proceeding to a step 17 after passing though the steps 1 to 5-19-18-16. The CPU 11 checks again (20, 21) whether or not the distances Yf and Yr measured by the distance measuring units 60f and 60r fall within the range defined by the fixed values Ys1 and Ys2. If not beyond the range, the subsequent step is to check once more (22) whether or not the difference between the measured distances Yf and Yr (the deviation in the advancing direction of the vehicle AVL from the guide board GBD) is within the range prescribed by the fixed values dY1 and dY2. If it falls within the range, data exhibiting [2] is update-written (23) to the register GCI. Subsequently, the lamp 63B is lit up (24), whereas the lamp 63Y is extinguished (25). Upon an extinction of the lamp 63Y, the brightness of the yellow display panel fades away, and the display of [parallel preparation] also disapears. An inner surface of a semi-transparent blue display panel is illuminated when the lamp 63B is lit up, and the blue display panel is thereby brightened, thus displaying characters of [during parallel traveling].

(3) Control over [parallel traveling]:

The CPU 11 computes a braking force K1. (Yf+Yf−DSR) necessary for making zero a deviation of a present distance measured value (Yf+Yr) from a reference value DSR (a content of a register DSR), a braking force K2.dY needed for restraining generation of the distance deviation due to variations in the distance (Yf+Yr), this braking force corresponding to a variation quantity dY (obtained by subtracting a value (Yf+Yf) measured last time from a value (Yf+Yr) measured this time) of the distance (Yf+Yr), and a braking force K4.dθ required for restraining generation of a deviation in the advancing direction due to variations of a deviation (Yf−Yr), this braking force corresponding to a variation quantity dθ (obtained by subtracting a deviation (Yf−YF) in the advancing direction that is calculated this time from a deviation (Yf−Yr) in the advancing direction that is given this time) of the deviation (YF−Yr) in the advancing direction. The CPU 11 next calculates a sum T of these braking forces (26) and checks (27R, 27L) whether the sum T exceeds an allowable value b (a positive value) (the right wheels are required to be controlled) or is smaller than an allowable value −b (the left wheels are required to be controlled). More specifically, the distance between the vehicle AVL and the guide board GBD is adjusted to the reference distance (DSR conceived as a content of the register DSR). Simultaneously, the CPU 11 calculates a value of braking torque T (a positive value implies a necessity for braking the right wheels, whereas a negative value implies a necessity for braking the left wheels) needed for paralleling the vehicle AVL with the guide board GBD. The CPU 11 then checks (26, 27R, 27L) whether or not the thus calculated value is relatively large enough to necessitate braking.

If judged to necessitate braking of the right wheels, the necessary braking torque T is proportionally distributed to a brake pressure Pfr necessary for the front right wheel and to a brake pressure Prr needed for the rear right wheel. These brake pressures Pfr and Prr are converted (28R, 30R, 29R, 31R) into target values of electric currents with which the pressure control valve devices 3 and 4 are charged. The right wheel brake pressure has to be generated in a state where the brake pedal 1 is not yet treaded, and hence the pump 18A has to be driven. For this purpose, the electric motor 19 is electrified. The electric motor 19, however, drives the pumps 18 and 18A, simultaneously, and it follows that the pump 18 is concomitantly driven to produce a left wheel brake pressure on electrifying the electric motor 19. Prevention of the brake pressures from being exerted on the left wheel brakes 7 and 9 involves a step of setting (32R, 33R) target current values IfL and IrL catered for the pressure control valve devices 3A and 4A at a maximum value Im (see FIG. 1c) adaptive to make the left wheel brake pressures virtually zero.

If judges to necessitate braking of the left wheels, the necessary braking torque T is proportionally distributed to a brake pressure PfL needed for braking the front left wheel and to a brake pressure PrL required for braking the rear left wheel. These brake pressures PfL and PrL are converted (28L, 30L, 29L, 31L) in to target values of electric currents with which the pressure control valve devices 3A and 4A are charged. The left wheel brake pressure has to be generated in a state where the brake pedal 1 is not yet treaded, and therefore the pump 18 has to be driven. For this purpose, the electric motor 19 drives the pumps 18 and 18A simultaneously, and it follows that the pump 18A is concomitantly driven to produce the right wheel brake pressure on electrifying the electric motor 19. Prevention of the brake pressures from being applied to the right wheel brakes 6 and 8 involves a step of setting (32L, 33L) target current values Ifr and Irr catered for the pressure control valve devices 3 and 4 at the maximum value Im (see FIG. 1c) adaptive to make the right wheel brake pressures virtually zero.

After the electrification current values for the pressure control valve devices have thus been set (update-written to the output register), electrifying of the electric motor 19 is set (update-written to the output register) (35). Written (35) to a register PDF is [1] indicating that the electrification of the electric motor 19 is now being set. Thereafter, the operation returns to the main foutine. Note that the data of the output register are outputted from the CPU 11 to the latch 35 at the subroutine (OT) of [output]. Further at the subroutine (OT) of [output], the vehicle-speed-correspondence current adjustment values (brake pressure adjustment values: those for causing the brake pressures to decrease with higher velocities) proportional to the vehicle speeds (estimated) are update-outputted to the D/A converter 24. It is to be noted that when making unnecessary the control over the wheel brake pressures by use of the CPU 11, the current adjustment values come to zero (non-electrification).

When the calculated necessary braking torque T is within an allowable range (greater than −b but smaller than b) (braking the wheel is not required), there is made a reference to a content of the register PDF. If the content is 1 (the pumps 18 and 18A continue to be driven: wheel braking is kept ON), the electrification of the electric motor 19 is stopped (non-electrification is update-written to the output register)) (37), and reset electrification of the whole pressure control valve devices is set (Ifr=Im. Irr=Im, IfL=Im and IrL=Im are update-written to the output register). Then starts a timer Tr for counting a time Tr required for extracting the wheel brake pressures to the reservoirs 20 and 20A (39). The operation returns to the main routine (40) after permitting an interruption of the internal timer Tr.

By virtue of the permission of this interruption, the internal timer Tr becomes time-over, and in response to this the CPU 11 executes [internal timer Tr interruption] (ITI) illustrated in FIG. 2d. To be more specific, the electrification of the entire pressure control valve devices is stopped (Ifr=0, Irr=0, IfL=0 and IrL=0 m are update-written to the output register: 41), the content of the register PDF is updated to 0 (the electric motor is charged with no electricity) (42). The internal timer tr is cleared (43), and the internal timer Tr interruption is inhibited (44). The operation returns to a step just before moving to this interruption.

After initiating, as described in (2), [parallel control], the control (26 to 40 of FIG. 2c, FIG. 2d) over [parallel traveling] of (3) continues during a period for which the steering wheel is continuously at a angle of a neutral range (a predetermined allowable range with a neutral point serving as the center) without putting the instruction switch 62 again into the closed state (ON), initiating the antiskid control and the traction slip control and treading on the brake pedal.

That is to say, the CPU 11 moves to [parallel control] (GC) virtually at a cycle dt and executes the steps of 26 to 40 inclusive. The CPU 11 calculates the left or right wheel braking torque T necessary for causing the vehicle to travel at a distance of reference value from the guide board GBD while paralleling the vehicle with the guide board. If the calculated torque T is within a range enough to necessitate an application of the brake pressure, the electric motor 19 is electrified to drive the pumps 18 and 18A. Brake pressure proportional to the torque T is applied to the left or right wheel alone (26 through 35). If the torque T is beyond the range in which the application of the brake pressure is needed, the electric motor 19 is not electrified, and no brake pressure is produced (26-27R-27L-36). While electrifying the electric motor 19, the electrification of the electric motor 19 is cut off, and the brake pressure of a wheel brake pressure line is extracted (36-37 through 40, ITI of FIG. 2d).

Under the control over [parallel traveling], the vehicle AVL travels virtually in parallel with the guide board GBD while keeping the distance (Yf+Yr) to the guide board GBD virtually to the reference value (DSR).

For instance, as depicted in FIG. 3, when the vehicle AVL undergoes a relatively heavy sideway wind on its left side surface and thereby moves, as indicated by a dotted line, in the right direction. At this time, $$T = K1 \cdot (Yf + Yr - DSR) + K2 \cdot dY + K3 \cdot (Yf - Yr) + K4 \cdot d\theta$$

where dY: (a value (Yf+Yr) measured this time)−(a value (Yf+Yf) measured last time), and dθ: (an advancing-directional deviation (Yf−Yr) calculated this time)−(an advancing-directional deviation (Yf−Yf) calculated last time).

In these formulae, all the terms of right-hand members exhibit negative values. The necessary braking torque T has a relatively large negative absolute value. In this case, the brake pressures proportional to the absolute value of the torque T are exerted on the left wheel brakes 7 and 9 at the steps of 28L through 33L and 34, whereas the right wheel brakes are subjected to no brake pressure. As a result, a left turning force is generated by action of the brake pressure. More specifically, when a right deflection starts taking place due to the sideway wind, the left turning force acting against it is generated to prevent a large right deflection beforehand, and at the same moment the right deflection which has already been caused is modified.

(4) Release of [parallel traveling]:

(4-1): The parallel traveling instruction switch 62 is classified as a moment close type of switch (which remains closed only during depression by a finger but reverts to the open state on separating the finger therefrom). Hence, the switch 62 reverts to the open state during an execution of [parallel traveling] of (3). When returning to the open state, a register SWF is cleared (5, 19).

When executing [parallel traveling] of (3), the driver momentarily depresses the switch 62 (closing). At this time, the CPU 11 writes [1] to the register SWF (5-6-7). The content of the register GCF is 1, and hence the operation moves from the step 8 to the step 45. When charging the electric motor 19 with no electricity (PDF=0), the registers GCF, PDF and GCI are cleared (0 is update-written) (53), and subsequently the lamps 63Y and 63B are put off (54). When electrifying the electric motor 19 (PDF=1), the electrification of the electric motor 19 is cut off, and the brake pressure of the wheel brake pressure line is extracted (47 to 50, ITI of FIG. 2d). The registers GCF and PDF are cleared (0 is update-written) (53), while the lamps 63Y and 63B are extinguished (54).

In consequence of these operations, the CPU 11 waits for an instruction of [parallel traveling] of (1).

(4-2): When initiating the antiskid control during the execution of [parallel traveling] of (3), a content of a register ACF comes to 1. In response to this, the CPU 11 moves from the step 1 to a step 53, where the registers GCF, PDF and GCI are cleared (0 is update-written). Thereafter, the lamps 63Y and 63B are extinguished (54).

As a result, the CPU 11 waits for an instruction of [parallel traveling] of (1).

Note that in this case the electric motor 19 is on the electrification or ceases to be electrified. Under [antiskid control] (AC), however, the electrification of the electric motor 19 or a stoppage thereof are set. Therefore, in the case of releasing [parallel traveling], the electrification/non-electrification of the electric motor 19 are not set. Besides, electrifying current values of the pressure control valve devices 3, 4, 3A and 4A are also set under [antiskid control] (AC), thereby setting no electrifying current value (0 of the non-electrification in this case) of the pressure control valve devices when releasing [parallel traveling].

(4-3): When executing [parallel traveling] of (3), the traction slip control is started, at which time the content of the register TCF comes to 1. Responding to this, the CPU 11 moves from the step 2 to the step 53, where the registers GCF, PDF and GCI are cleared (0 is update-written). Thereafter, the lamps 63Y and 63B are put off (54).

Consequently, the CPU 11 waits an instruction of [parallel traveling] of (1).

It is to be noted that in this case the electric motor 19 is on the electrification or ceases to be electrified. Under [traction slip control] (TC), however, the electrification of the electric motor 19 or a stoppage thereof are set. Therefore, in the case of releasing [parallel traveling], the electrification/non-electrification of the electric motor 19 are not set. Besides, electrifying current values of the pressure control valve devices 3, 4, 3A and 4A are also set under [traction slip control] (TC), thereby setting no electrifying current value (0 of the non-electrification in this case) of the pressure control valve devices when releasing [parallel traveling].

(4-4): When executing [parallel traveling] of (3), a rotary angle of the steering wheel STW deviates from a small neutral allowable range with a neutral point serving as the center—i.e., the driver intentionally rotates the steering wheel STW through some angle. At this time, the CPU 11 passes through the steps 4 and 46A and then cuts off the electrification of the electric motor 19, if the motor 19 is being charged with electricity. The brake pressure of the wheel brake pressure line is extracted (46B-47 to 50, ITI of FIG. 2d). Thereafter, the registers GCF, PDF and GCI are cleared (0 is update-written) (53), and the lamps 63Y and 63B are put off (54).

As a result, the CPU waits for an instruction of [parallel traveling] of (1).

The CPU 11 releases [parallel traveling] corresponding to turning of the steering wheel SYW. Therefore, when the driver rotates the wheel STW to change the traveling lane, as indicated by a dotted line of FIG. 4, to an intermediate speed traveling lane, viz., a position V7, [parallel traveling] of (3) is automatically released.

(5) Temporal suspension of [parallel traveling]:

When executing [parallel traveling] of (3), the brake pedal 1 is treaded (the switch 65 changes from the open state to the closed state), the CPU 11 moves from the step 3 to the step 51, where the electrification of the electric motor 19 is stopped. Subsequently, all the pressure control valve devices cease to be electrified (52). Note that at [output] (OT) current adjustment values corresponding to the vehicle speeds are also set to 0 (non-electrification). When stopping the electrification of the electric motor 19 and the whole pressure control valve devices, the registers GCF, PDF and GCI are not cleared as well as effecting no extinction of the lamps 63Y and 63B. Hence, the switch 65 returns to the open stat after releasing the brake pedal 1, at which time the control over [parallel traveling] of (3) is initiated.

In the foregoing embodiments, there are established both of two conditions such as an instruction given by the parallel traveling instruction switch 62 and receiving of the parallel traveling guide waves, and therefore the control over [parallel traveling] is arranged to start. Where any one of these conditions becomes valid, the control over [parallel traveling] may be initiated. Parallel traveling is controlled on the basis of the measured distances between the vehicle and the guide board GBD. However, both or one of fringes of the traveling or the central line (solid line or dotted line) or vehicle positions relative to a guide (linear or point distribution) are measured or detected, and parallel traveling may be controlled in accordance with these results. Another possible measuring method involves the steps of setting the guide board GBD as a photoreflective body, forming an image of the photoreflective body by projecting the light thereon from the vehicle and measuring a distance therebetween from a size of image of the photoreflective body, the image being formed on a photographing picture. Still another possible method comprises the the steps of setting the guide board GBD as an antenna wire from which radio waves are transmitted or an AC electrifying wire for generating an induction field and measuring a distance therebetween from the vehicle on the basis of a radio wave receiving level or an induction field sensing level.

In accordance with the above-described embodiments, the brake pressures of the respective wheel brakes are adjusted by means of the individual pressure control valve devices. However, the right and left wheel brakes may be paired, and the pressures of each pair of right and left wheel brakes may be adjusted to exhibit a differential relationship by use of respective differential pressure adjusting valve devices.

In any case, according to the parallel traveling control systems in the first and second embodiments of the present invention, the brake pressures of the right and left wheel brakes (7,9/6,8) are so adjusted that distances to the guide means (GBD) which are given by the distance detecting means (60f, 60r) become set values, thus keeping constant the distances between the vehicle and the guide means (GBD).

As discussed above, the adjustment in the advancing direction of the vehicle for maintaining the vehicle at constant distances with respect to the guide means (GBD) is made by controlling the pressures of the right and left wheel brakes (7,9/6,8). With this arrangement, the steering wheel is not automatically rotationally driven for the automatic parallel traveling control, thereby eliminating a strange feeling of the driver in terms of steerage.

According to the parallel traveling control system in the second embodiment of the present invention, when rotationally driving the steering wheel, the wheel rotation detecting means (61) detects the rotation. In response to the detection thereof, the parallel control means (10) causes a stop of automatic parallel traveling. Therefore, when the vehicle maintains automatic parallel traveling after the instructing means (62, 68) have designated automatic parallel traveling, and if the driver rotationally drives the steering wheel to change the course or exit from the highway, automatic parallel traveling is automatically released, whereby the vehicle travels in accordance with the driver's steerage. As explained earlier, the automatic parallel traveling control can automatically be released by the steerage which meets the intention of the driver without effecting the releasing operations of returning the parallel traveling instruction switch to the open state where releasing is designated and setting the release instruction switch in the closed state where releasing is instructed. Thus, the burdens on the driver are relieved, and the course can smoothly be changed as the driver intends.

Although the illustrative embodiments of the present invention have been described in detail with reference to the accompanying drawings, it is to be understood that the present invention is not limited to those precise embodiments. A variety of modifications or changes may be effected therein without departing from the scope or spirit of the invention.

What is claimed is:

1. A parallel traveling control system comprising:
   brake pressure adjusting means for adjusting brake pressures of bilateral wheel brakes;
   distance detecting means for detecting distances to a guide means provided on a road surface of a traveling lane or set in the vicinity of said road surface along said traveling lane; and
   a parallel control means for driving said brake pressure adjusting means, said parallel control means specifying pressures for each wheel brake to thereby adjust the direction of travel of the vehicle such that the distances detected by said distance detecting means coincides with a set value while referring to the distances.

2. The parallel traveling control system of claim 1 wherein said guide means is provided on a road surface of a traveling lane.

3. The parallel traveling control system of claim 1 wherein said guide means is set in the vicinity of said road surface along said traveling lane.

4. A parallel traveling control system comprising:
   brake pressure adjusting means for adjusting brake pressures of right and left wheel brakes;
   a wheel rotation detecting means for detecting a rotation of a steering wheel;
   distance detecting means for detecting distances to a guide means, said guide means provided along a road surface traveling lane; and
   a parallel control means for initiating automatic parallel traveling to drive said brake pressure adjusting means to change the direction of travel of the vehicle such that the distances coincide with set values while referring to the distances detected by said distance detecting means when automatic parallel traveling is designated but stopping said automatic parallel traveling when said wheel rotation detecting means detects the rotation of said steering wheel.

5. The parallel traveling control system of claim 4 wherein said guide means is provided on a road surface of a traveling lane.

6. The parallel traveling control system of claim 4 wherein said guide means is set in the vicinity of said road surface along said traveling lane.

* * * * *